United States Patent
Haberland

(10) Patent No.: US 8,289,141 B2
(45) Date of Patent: Oct. 16, 2012

(54) AUXILIARY SYSTEM FOR MOTOR VEHICLES

(75) Inventor: Udo Haberland, Holzgerlingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 747 days.

(21) Appl. No.: 12/296,394

(22) PCT Filed: Apr. 18, 2007

(86) PCT No.: PCT/EP2007/003386
§ 371 (c)(1),
(2), (4) Date: Jul. 31, 2009

(87) PCT Pub. No.: WO2007/121902
PCT Pub. Date: Nov. 1, 2007

(65) Prior Publication Data
US 2009/0322501 A1    Dec. 31, 2009

(30) Foreign Application Priority Data
Apr. 21, 2006  (DE) .......... 10 2006 018 585

(51) Int. Cl.
*B60Q 1/00* (2006.01)
(52) U.S. Cl. ............ 340/435; 340/903; 340/932.2; 701/301
(58) Field of Classification Search ............ 340/903, 340/435, 904, 943, 932.2; 342/70; 180/169; 701/301
See application file for complete search history.

(56) References Cited

U.S. PATENT DOCUMENTS

| | | | |
|---|---|---|---|
| 3,898,652 A | 8/1975 | Rashid | |
| 5,235,316 A * | 8/1993 | Qualizza | 340/436 |
| 5,940,011 A * | 8/1999 | Agravante et al. | 340/903 |
| 6,025,797 A * | 2/2000 | Kawai et al. | 342/70 |
| 6,265,968 B1 | 7/2001 | Betzitza et al. | |
| 6,452,533 B1 * | 9/2002 | Yamabuchi et al. | 342/70 |
| 6,542,111 B1 | 4/2003 | Wilson | |
| 6,657,581 B1 * | 12/2003 | Lippert et al. | 342/70 |
| 6,674,394 B1 | 1/2004 | Zoratti | |
| 6,999,003 B2 * | 2/2006 | Matsukawa et al. | 340/932.2 |
| 7,463,138 B2 * | 12/2008 | Pawlicki et al. | 340/435 |
| 2002/0107637 A1 * | 8/2002 | Okamura et al. | 701/301 |
| 2004/0093141 A1 | 5/2004 | Rao et al. | |
| 2005/0190048 A1 | 9/2005 | Yagyu et al. | |
| 2005/0195071 A1 | 9/2005 | Ewerhart et al. | |
| 2010/0238066 A1 * | 9/2010 | Lohmeier et al. | 342/70 |

FOREIGN PATENT DOCUMENTS

EP    0 717 290 A2    6/1996

OTHER PUBLICATIONS

PCT Search Report of the ISA from PCT/EP2007/003386 dated Aug. 21, 2007.

* cited by examiner

*Primary Examiner* — Brent Swarthout
(74) *Attorney, Agent, or Firm* — Daly, Crawford, Mofford & Durkee, LLP

(57) ABSTRACT

The invention relates to an assistance system for motor vehicles (20), said system having a distance detection system (4) and a warning system (6), wherein provision is made of an evaluation unit (18) which combines items of information (12, 14, 16) obtained by the distance detection system (4) and by the warning system (6). The invention also relates to a method for operating an assistance system (2).

17 Claims, 2 Drawing Sheets

AUXILIARY SYSTEM FOR MOTOR VEHICLES

CROSS REFERENCE TO RELATED APPLICATION

This application claims the benefit of International Patent Application PCT/EP2007/003386 filed Apr. 18, 2007, published in the German language as WO2007/121902, which application claims priority from German application number 10 2006 018 585.4, filed Apr. 21, 2006.

BACKGROUND

The invention concerns an auxiliary system for motor vehicles with a distance detector for determining the distance of a motor vehicle to stationary obstacles that are located in a side area relative to the motor vehicle, and with a warning system for giving a warning signal upon detection of moving obstacles that are located in a side or rear area relative to the motor vehicle.

Such auxiliary systems serve to increase the comfort and security of a motor vehicle. With the distance detection system data can be obtained about how far the motor vehicle is from stationary obstacles, for example fixed constructions such as walls, crash barriers or trees and shrubbery as well. With the help of the warning system a signal can communicate to the driver that there is a moving obstacle in a side and/or rear area of a vehicle. The moving obstacle is usually another motor vehicle but it can also be a bicyclist or pedestrian.

SUMMARY

In the auxiliary systems known up to now there is the disadvantage that the separate systems, that is distance detection system and warning system, can mutually affect each other in a detrimental way so that either the detection measurement is distorted or the warning signal is activated in error.

In view of this, the problem of the present invention is to create an auxiliary system in which the above-mentioned disadvantages could be avoided.

This problem is solved in terms of the invention in that an evaluation unit is provided that—for determining the distance of the motor vehicle to a stationary obstacle and/or emission of a warning signal upon detection of a moving obstacle—links the data obtained by the distance detection system and the warning system with each other.

With the auxiliary system according to the invention data or signals that are detected by the corresponding sensors of the individual systems are evaluated not only with regard to the respective aim of an individual system, but linked with the data of other systems in the evaluation unit. In this way it is possible, in certain driving situations as will be explained in detail below, to achieve detection of distance without distortion of the results and avoid an erroneous activation of a warning signal.

The warning system may comprise, for instance, a system for detecting moving obstacles that are located in an area not visible to the driver in the rear-view mirror of the motor vehicle. This area is also called "blind angle" or "blind spot". When there are obstacles in this area, the related data can be used to influence the determination of the distance of the motor vehicle to stationary obstacles. For example, data concerning moving obstacles that are in the "blind spot" can be overlapped with the data for determining distance of a stationary obstacle. Then the data concerning a wide-angular range for the distance detection system can be reduced to the data for a definite angular range ("blind spot") so that only the remaining data for determining the distance of the motor vehicle to stationary obstacles is used.

The warning system can also comprise additionally or optionally a system for detecting moving obstacles that approach the motor vehicle from the rear. Such a system serves above all to warn the driver of a quickly approaching vehicle. This is the case, for example, when on a right-hand traffic road one's own vehicle is moving in the right lane of the freeway with a comparatively lower speed and in the left lane a vehicle approaches at a faster speed. In order also to guarantee in this case that the distance detection device reliably detects the distance to the crash barrier of the freeway, the data obtained by the warning system can be overlapped with the data of the distance detection system in the manner mentioned above.

The warning system can additionally or optionally comprise other systems as well, for instance a system for aid in changing lanes. In an intended change of lane such a system would warn the driver of moving obstacles that are present in the lane to which the driver of a vehicle would like to change.

The warning system can also comprise, for example, a system for preparing the motor vehicle for an imminent accident and also comfort systems like a parking aid system and/or a system for automating driving and braking. The latter serve to accelerate and brake automatically the vehicle in stop-and-go traffic, or move at an appropriate speed in slow line traffic.

The distance detection system and/or warning system can comprise radar sensors and/or ultrasound sensors. It is especially advantageous when different angular ranges of a multi-beam radar are assigned to the distance detection system and the warning system. In this connection certain angular ranges are assigned to the distance detection system and other angular ranges to the warning system.

It is also possible that different angular ranges of a radar system with a swiveling radar beam are assigned to the distance detection system and warning system. Such a "scanning" system enables the assignment of individual angular ranges to the different systems.

Separate sensors can be assigned respectively to the distance detection system and the warning system. These can be constructed similarly or differently.

The sensor or sensors of the distance detection system and/or warning system can be located in a lateral area of the front and rear bumpers. These areas are well suited for integrating the sensors in a visually inconspicuous manner.

It is also possible that the sensor or sensors be located in a rear-view mirror of the motor vehicle or immediately next to it. The outside side mirrors as well as inside mirror of the vehicle are available for this.

The invention further concerns a process for the operation of an auxiliary system for motor vehicles with a distance detector for determining the distance of a motor vehicle to stationary obstacles that are located in a side area relative to the motor vehicle, and with a warning system for giving a signal upon detection of moving obstacles that are located in a side or rear area relative to the motor vehicle. The process is wherein the data obtained by the distance detection system and the warning system to determine the distance of a motor vehicle to a stationary obstacle and/or give a warning signal upon detection of a moving obstacle are linked with each other. Thereby the advantages cited at the outset are achieved.

A particular provision is that the emission of a warning signal is suppressed when the motor vehicle falls short of a minimum distance to a stationary obstacle. In this manner of linking data of different systems the fact is considered that it is not possible, when falling short of a minimum distance that a stationary obstacle would come between one's own vehicle and the stationary obstacle located at the side of the vehicle. If, for example, a minimum distance to a stationary obstacle is set at one meter and this stationary obstacle has the form of a crash barrier, it is possible that a vehicle detected by the warning system could come between the motor vehicle and the crash barrier. In this configuration the warning signal can be suppressed so that the driver of the motor vehicle is not interrupted by signals needlessly and can pay more attention to those warning signals that are actually emitted.

Likewise it is possible that—with detection of a moving obstacle by the warning system—for the determination of the distance of the motor vehicle to a stationary obstacle only those data are used that do not concern the angular range in which the warning system has detected a moving obstacle. In other words: those data that concern the angular range in which the warning system has detected a moving obstacle is "masked out", so that the determination of the distance to the stationary obstacles is not distorted.

The "mask out" can be achieved when the relevant data of the evaluation unit are not passed on or the relevant data are filtered by the evaluation unit.

Further advantages, features and peculiarities of the invention will emerge from the following description in which a particularly preferred working example of the invention is explained in detail in reference to the drawings. Thus the features shown in the drawings as well as mentioned in the claims and description can be essential to the invention either singly or in any combination. The drawings show:

DETAILED DESCRIPTION

Figure 1:
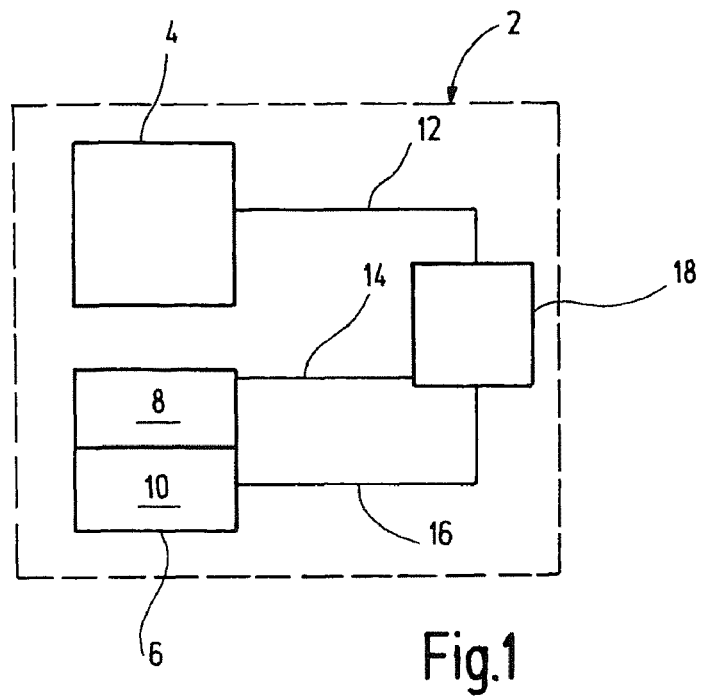
FIG. 1 a schematic view of the construction of an auxiliary system according to the invention.

FIG. 1 shows an auxiliary system for motor vehicles with reference signs [2]. This shows a distance detection system [4] to determine the distance of a motor vehicle to stationary obstacles that are located in a lateral area relative to the motor vehicle.

Further the auxiliary system [2] comprises a warning system [6] to emit a warning signal upon detection of moving obstacles that are located in a lateral and/or rear area relative to the motor vehicle.

The warning system [6] comprises two subsystems. These are one subsystem that serves to detect moving obstacles located in an area not visible in a rear-view mirror of the motor vehicle and another subsystem [10] to detect moving obstacles approaching a motor vehicle from the rear.

The distance detection system [4] produces data [12], the subsystem [8] data [14] and the subsystem [10] data [16]. The data [12 to 16] is conveyed over corresponding data lines of a common evaluation unit [18].

Figure 2:
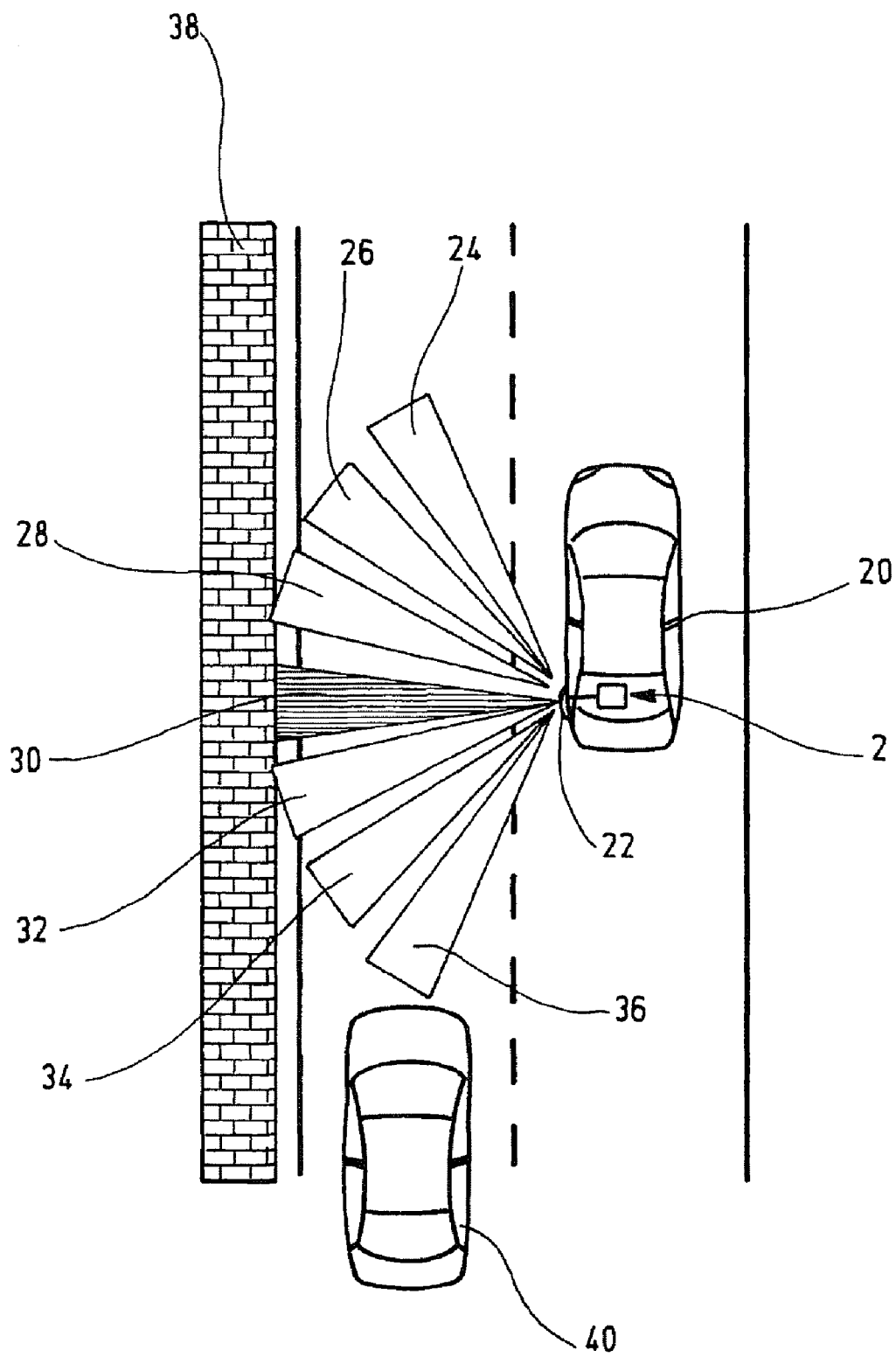
FIG. 2 a top view of a motor vehicle with the auxiliary system of FIG. 1.

The auxiliary system [2] is arranged in a motor vehicle [20] represented in FIG. 2. The auxiliary system [2] comprises further a radar sensor [22] that is arranged in a lateral area of the motor vehicle [20] at the height of rear bumper.

The radar sensor [22] is formed to emit and receive radar signals in a wide angular range. FIG. 2 represents several angular ranges [24 to 36] starting from a forward lateral area on to a rear lateral area.

With the distance detection system [4] of the auxiliary system [2] a stationary obstacle [38] located on the side of the motor vehicle [20] can be detected and the distance is then determined. According to FIG. 2 the stationary obstacle [38] is represented as a wall bordering the driving lane.

With the help of subsystems [8 and 10] of the warning system [6] moving obstacles in a side and/or rear area of the motor vehicle can be detected, for example, the obstacle [40] is represented as another vehicle.

Figure 3:
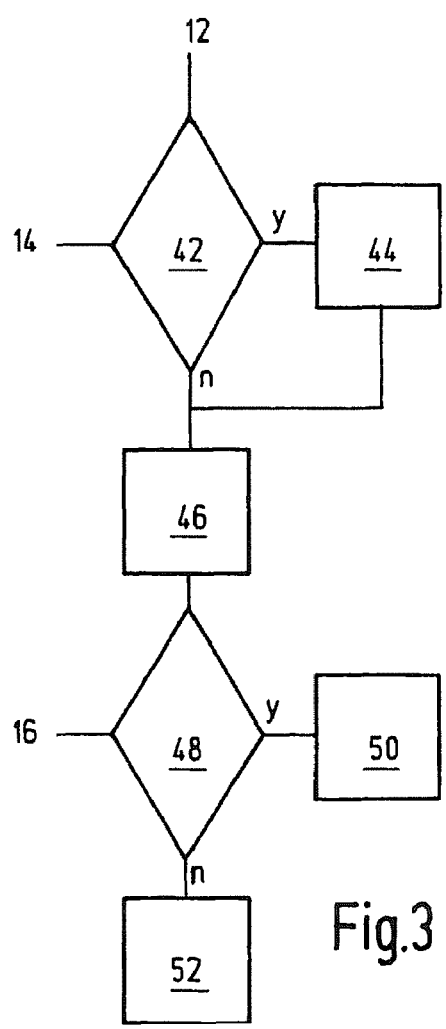
FIG. 3 a flow chart to clarify the operational process of an auxiliary system.

In further reference to FIG. 3 data [12, 14 and 16] can be called up to achieve on the one hand that the distance to stationary obstacles [38] is detected in a reliable manner with the help of the distance detection system [4] and on the other hand that the warning system [6] does not emit signals in an undesirable manner.

As an example, a step [42] can test whether the subsystem [8] is in an operational state in which a warning signal is normally emitted. For this data [15] are called up. If this is the case (y=yes according to FIG. 3), the data [12] of the distance detection system [4] can be modified in a step [44] so that data to determine the distance of the motor vehicle [20] to a stationary obstacle [38] that concern the angular range (for example, the angular range [36]) can be faded out. Such modified data can be used in a step [46] to determine the distance of the motor vehicle [20] to the stationary obstacle [38].

When a test of the data [14] in step [42] has the result that no warning signal should be emitted (n=no), the data [12] can remain unchanged. In this case the same distance of the motor vehicle [20] to the stationary obstacle [38] is determined in step [46], as before in the test [42].

A further step [48] can test whether the distance determined in step [46] falls short of a definite minimum distance. If this is the case (y=yes) no warning signal will be emitted in a step [50]—in spite of the concern of corresponding data [16] of the subsystem [10] of the warning system [6]—since it will happen that the moving obstacle [40], when the minimum distance is fallen short of, cannot come between the vehicle [20] and the stationary obstacle [38]. If the test in step [48] has the result that an allowable minimum distance is not fallen short of (n=no), a warning signal will be emitted in step [52]. This can take place by warning sounds or in a visual manner.

The invention claimed is:

1. An auxiliary system comprising:
    a distance detection system configured to determine a distance between a motor vehicle and one or more stationary obstacles located in a side area relative to the motor vehicle;
    a warning system configured to provide a warning signal upon detection of one or more moving obstacles located in a side or rear area relative to the motor vehicle, the warning system comprising:
        a first system configured to detect moving obstacles that are located in an area not visible to a driver in a rear-view mirror of the motor vehicle;
        a second system configured to detect moving obstacles that approach the motor vehicle from a rear direction;
    an evaluation unit configured to process data from the distance detection system and at least one of data from the first system and data from the second system to determine whether to suppress the warning signal.

2. The auxiliary system according to claim 1 wherein the warning system comprises a system to aid in changing lanes.

3. The auxiliary system according to claim 1 wherein the warning system comprises a system for preparing the motor vehicle for an imminent accident.

4. The auxiliary system according to claim 1 wherein the warning system comprises a parking help system.

5. The auxiliary system according to claim 1 wherein the warning system comprises a system for automating driving and braking processes.

6. The auxiliary system according to claim 1 wherein the distance detection and/or warning system comprise at least one of: one or more radar sensors and one or more ultrasound sensors.

7. The auxiliary system according to claim 1 wherein different angular regions of a multi-beam radar are assigned to the distance detection system and the warning system.

8. The auxiliary system according to claim 1 wherein different angular regions of a radar system with a swiveling radar beam are assigned to the distance detection system and the warning system.

9. The auxiliary system according to claim 1 wherein individual sensors are assigned to the distance detection system and the warning system.

10. The auxiliary system according to claim 1 wherein sensors of varying types of construction are assigned to the distance detection system and the warning system.

11. The auxiliary system according to claim 1 wherein a sensor or sensors of at least one of the distance detection system and the warning system are located in a lateral area of the front bumper of the motor vehicle.

12. The auxiliary system according to claim 1 wherein a sensor or sensors of at least one of the distance detection system and the warning system are located in a lateral area of the rear bumper of the motor vehicle.

13. The auxiliary system according to claim 1 wherein a sensor or sensors of at least one of the distance detection system and the warning system are located in a rear-view mirror of the motor vehicle or immediately next to it.

14. A process, comprising:
   determining if a moving obstacle is in an area comprising an area not visible to a driver in a rear-view mirror;
   determining if a moving obstacle is approaching the motor vehicle from a rear direction;
   detecting a moving vehicle in response to the determining if a moving obstacle is in an area comprising an area not visible to a driver in a rear-view mirror and the determining if a moving obstacle is approaching the motor vehicle from a rear direction;
   determining a distance between the motor vehicle and a stationary obstacle located in a side area relative to the motor vehicle; and
   determining whether to suppress a warning signal indicating that the moving obstacle is detected in response to the distance determined.

15. The process according to claim 14, further comprising suppressing the warning signal if the distance determined is less than a minimum distance.

16. The process according to claim 14, further comprising filtering an angular motion of the moving object detected,
   wherein determining the distance between the motor vehicle and the stationary obstacle comprises not using the angular motion to determine the distance.

17. The auxiliary system according to claim 1 wherein the auxiliary system is configured to filter an angular motion of the moving object detected and to determine the distance between the motor vehicle and the stationary obstacle without using the angular motion to determine the distance.

* * * * *